(12) United States Patent
Shah et al.

(10) Patent No.: US 9,072,022 B1
(45) Date of Patent: Jun. 30, 2015

(54) DYNAMIC REPORT OF REFERENCE SIGNAL RECEIVED QUALITY BY A WIRELESS COMMUNICATION DEVICE

(71) Applicant: Sprint Communications Company L.P., Overland Park, KS (US)

(72) Inventors: Maulik K. Shah, Overland Park, KS (US); Jasinder Pal Singh, Olathe, KS (US); Siddharth Oroskar, Overland Park, KS (US); Anoop Kumar Goyal, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 249 days.

(21) Appl. No.: 13/868,441

(22) Filed: Apr. 23, 2013

(51) Int. Cl.
*H04W 36/00* (2009.01)
*H04W 36/30* (2009.01)

(52) U.S. Cl.
CPC ..................................... *H04W 36/30* (2013.01)

(58) Field of Classification Search
CPC ... H04W 36/0094; H04W 36/14; H04L 43/16
See application file for complete search history.

(56) References Cited

U.S. PATENT DOCUMENTS

| | | | |
|---|---|---|---|
| 8,473,006 B1 * | 6/2013 | Halferty et al. | 455/557 |
| 2011/0176430 A1 | 7/2011 | Zetterberg et al. | |
| 2011/0281587 A1 | 11/2011 | Jokinen et al. | |
| 2013/0095819 A1 * | 4/2013 | Cheng et al. | 455/424 |

* cited by examiner

*Primary Examiner* — Kashif Siddiqui

(57) ABSTRACT

A wireless communication device comprises a wireless communication transceiver and a processing system. The wireless communication transceiver is configured to measure reference signal received power (RSRP) values and reference signal received quality (RSRQ) values of a plurality of candidate sectors. The processing system is configured to determine a greatest relative difference between the RSRP values of the candidate sectors. If the greatest relative difference between the RSRP values of the candidate sectors falls below a power threshold, the processing system is configured to direct the wireless communication transceiver to transfer the RSRP values of the candidate sectors and one of the RSRQ values associated with a strongest candidate sector that has a greatest RSRP value of the candidate sectors, and if the greatest relative difference between the RSRP values of the candidate sectors exceeds the power threshold, the RSRP values of the candidate sectors are transferred.

20 Claims, 5 Drawing Sheets

DYNAMIC REPORT OF REFERENCE SIGNAL RECEIVED QUALITY BY A WIRELESS COMMUNICATION DEVICE

TECHNICAL BACKGROUND

Wireless communication devices transmit and receive information wirelessly via a wireless access node to communicate over a communication network. Typically, the wireless access node is part of a radio access network (RAN) which provides the wireless communication devices with access to further communication networks, systems, and devices. The wireless communication devices utilize forward link communication channels to receive voice and/or data transmitted from the wireless access node, and reverse link communication channels to transmit information up to the node.

In fourth generation (4G) long term evolution (LTE) communication systems, a wireless communication device is referred to as user equipment (UE), while a wireless access node is called an enhanced node B (eNodeB). In LTE systems, handovers are controlled by the network but receive assistance from the UE. For intra-LTE mobility, the eNodeB is not required to provide a neighbor list to the UE. Instead, the UE performs measurements of reference signal received power (RSRP) and reference signal received quality (RSRQ) of surrounding candidate cells. Typically, based on pre-defined events, the UE would start sending measurement reports to a serving eNodeB that include RSRP and RSRQ values of all the candidate cells. The eNodeB then uses the information in the measurement report to make and execute a handover decision for the UE. In this manner, the UE assists the eNodeB in making the handover decision, but also uses a substantial amount of reverse link bandwidth to send the measurement reports.

Overview

A method of operating a wireless communication device to facilitate a handover from a serving sector to a candidate sector in a wireless communication network is disclosed. The method comprises measuring reference signal received power (RSRP) values and reference signal received quality (RSRQ) values of a plurality of candidate sectors. The method further comprises determining a greatest relative difference between the RSRP values of the candidate sectors. The method further comprises, if the greatest relative difference between the RSRP values of the candidate sectors falls below a power threshold, transferring the RSRP values of the candidate sectors and one of the RSRQ values associated with a strongest candidate sector having a greatest RSRP value of the candidate sectors. The method further comprises, if the greatest relative difference between the RSRP values of the candidate sectors exceeds the power threshold, transferring the RSRP values of the candidate sectors.

A wireless communication device to facilitate a handover from a serving sector to a candidate sector in a wireless communication network comprises a wireless communication transceiver and a processing system. The wireless communication transceiver is configured to measure reference signal received power (RSRP) values and reference signal received quality (RSRQ) values of a plurality of candidate sectors. The processing system is configured to determine a greatest relative difference between the RSRP values of the candidate sectors, and if the greatest relative difference between the RSRP values of the candidate sectors falls below a power threshold, direct the wireless communication transceiver to transfer the RSRP values of the candidate sectors and one of the RSRQ values associated with a strongest candidate sector having a greatest RSRP value of the candidate sectors. The processing system is further configured to, if the greatest relative difference between the RSRP values of the candidate sectors exceeds the power threshold, direct the wireless communication transceiver to transfer the RSRP values of the candidate sectors.

A computer apparatus to facilitate a handover from a serving sector to a candidate sector in a wireless communication network is disclosed. The computer apparatus comprises software instructions and at least one non-transitory computer-readable storage medium storing the software instructions. The software instructions are configured, when executed by a wireless communication device, to direct the wireless communication device to measure reference signal received power (RSRP) values and reference signal received quality (RSRQ) values of a plurality of candidate sectors, determine a greatest relative difference between the RSRP values of the candidate sectors, if the greatest relative difference between the RSRP values of the candidate sectors falls below a power threshold, transfer the RSRP values of the candidate sectors and one of the RSRQ values associated with a strongest candidate sector having a greatest RSRP value of the candidate sectors, and if the greatest relative difference between the RSRP values of the candidate sectors exceeds the power threshold, transfer the RSRP values of the candidate sectors.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
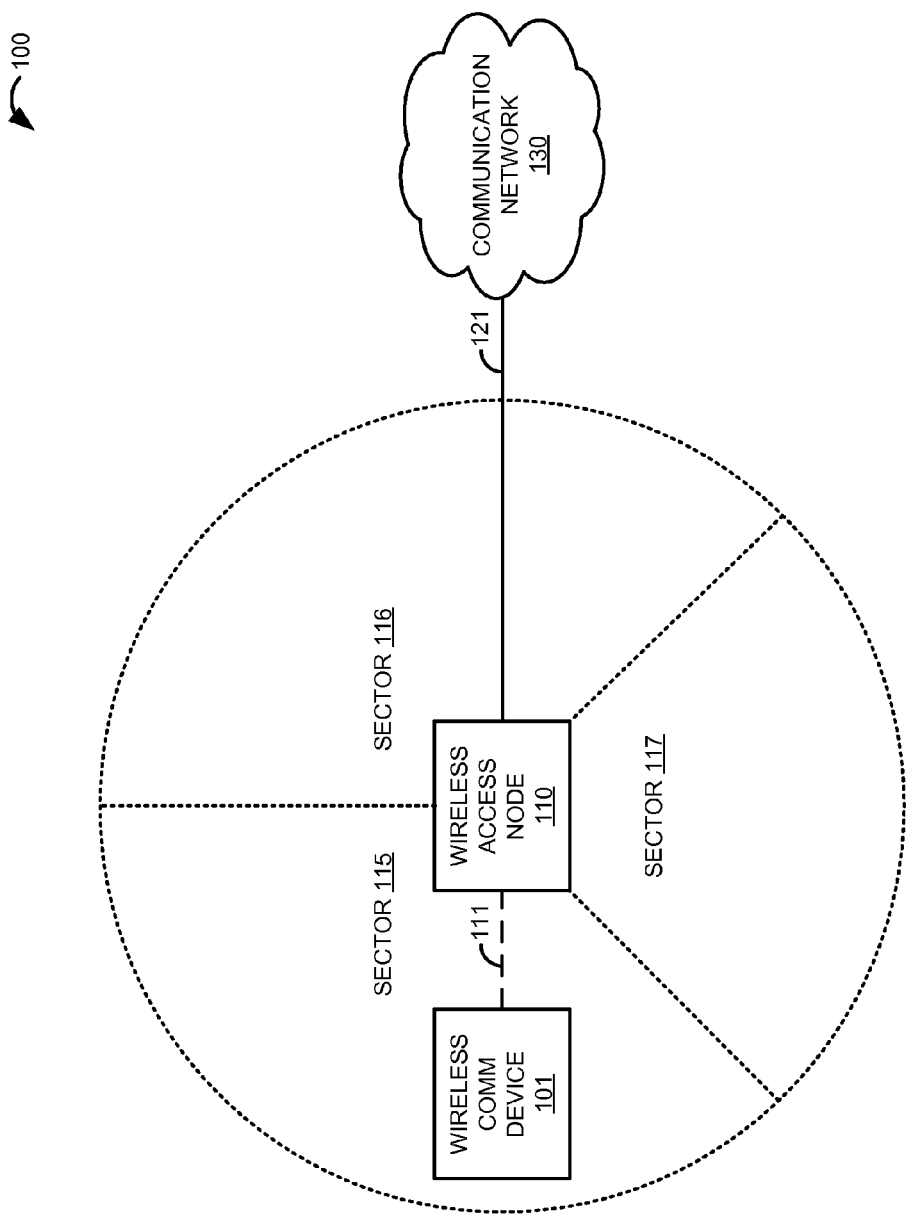
FIG. 1 is a block diagram that illustrates a communication system.

FIG. 1 is a block diagram that illustrates communication system 100. Communication system 100 includes wireless communication device 101, wireless access node 110, and communication network 130. Wireless communication device 101 and wireless access node 110 are in communication over wireless communication link 111. Wireless access node 110 and communication network 130 communicate over communication link 121. Wireless access node 110 has an approximate wireless coverage area as indicated by the dotted circle on FIG. 1, which is subdivided into cell sectors 115-117, where sector 115 is presently serving wireless communication device 101.

Figure 2:
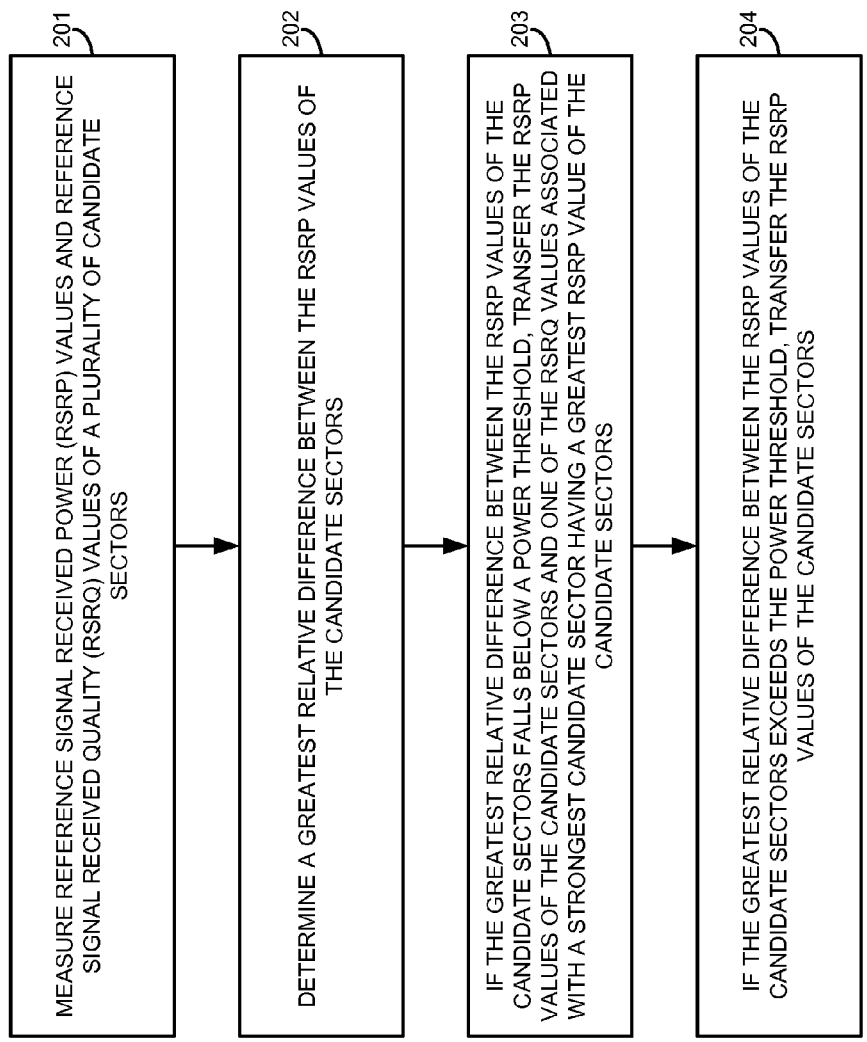
FIG. 2 is a flow diagram that illustrates an operation of the communication system.

FIG. 2 is a flow diagram that illustrates an operation of communication system 100. The steps of the operation are indicated below parenthetically. The operation of communication system 100 shown in FIG. 2 may be employed by wireless communication device 101 to facilitate a handover from a serving sector 115 to a candidate sector 116 or 117 in a wireless communication network.

To begin, wireless communication device 101 measures reference signal received power (RSRP) values and reference signal received quality (RSRQ) values of a plurality of candidate sectors (201). RSRP is typically a received signal strength indication (RSSI) type of measurement that indicates an average received power of reference signals from various candidate sectors within a certain frequency bandwidth, whereas RSRQ is typically a carrier/interference type of measurement that indicates the qualities of the respective received reference signals from each of the candidate sectors. In this example, the candidate sectors 116 and 117 are both provided by wireless access node 110 for clarity, but in some examples, the candidate sectors could be served by multiple wireless access nodes (not shown) and could include more than two sectors. Typically, wireless communication device 101 is operating in radio resource control (RRC) connected mode when measuring the RSRP and RSRQ values. Wireless communication device 101 typically receives measurement setup instructions from a serving wireless access node 110 during RRC configuration. The measurement setup instructions could include various parameters and conditions related to the type of measurements to perform, time between periodic reporting, trigger conditions for events that drive wireless communication device 101 to start and/or stop measurement reporting, filter parameters, measurement bandwidth, maximum number of candidate sectors to report, and the like. In some examples, wireless communication device 101 will initially measure just the RSRP values and will refrain from measuring RSRQ until necessary.

Wireless communication device 101 determines a greatest relative difference between the RSRP values of the candidate sectors (202). Typically, after measuring the RSRP values of the plurality of candidate sectors, wireless communication device 101 calculates differences between each of the RSRP values of all the candidate sectors and identifies a greatest one of the differences as the greatest relative difference. In other words, the greatest relative difference between the RSRP values of the candidate sectors could be defined as the largest difference between all the RSRP values relative to one another. For example, the greatest relative difference between the RSRP values could be calculated by subtracting the lowest RSRP value of the candidate sectors from the greatest RSRP value of the candidate sectors. In some examples, a clearly dominant candidate sector could be identified based on having a very high RSRP value relative to all the other candidate sectors, indicating a very strong reference signal from that strongest candidate sector that has the greatest RSRP value of the candidate sectors.

If the greatest relative difference between the RSRP values of the candidate sectors falls below a power threshold, wireless communication device 101 transfers the RSRP values of the candidate sectors and one of the RSRQ values associated with a strongest candidate sector having a greatest RSRP value of the candidate sectors (203). Typically, the power threshold is predetermined, but wireless communication device 101 could also determine the power threshold dynamically, such as based on a number of candidate sectors. In some examples, the power threshold could be previously stored or even hard-coded in wireless communication device 101, provided by wireless access node 110 or some other communication system in the measurement setup instructions, or provided to wireless communication device 101 in any other way. Wireless communication device 101 typically compares the greatest relative difference between the RSRP values of the candidate sectors to the power threshold, and if the greatest relative difference is lower than the threshold, transfers the RSRP values of all the candidate sectors and the RSRQ value of the strongest candidate sector for delivery to wireless access node 110. The strongest candidate sector is typically identified as the candidate sector that has the greatest RSRP value of all the candidate sectors, and could be more than one sector if multiple sectors share the same largest RSRP value. In some examples, if the greatest relative difference between the RSRP values of the candidate sectors falls below the power threshold, wireless communication device 101 could transfer the RSRP values of the candidate sectors and the RSRQ value of the strongest candidate sector for delivery to wireless access node 110 responsive to at least one condition being met to facilitate a handover. Wireless access node 110 could then utilize the RSRP values of the candidate sectors and the RSRQ value of the strongest candidate sector to determine the candidate sector for the handover.

However, if the greatest relative difference between the RSRP values of the candidate sectors exceeds the power threshold, wireless communication device 101 transfers the RSRP values of the candidate sectors (204). Typically, when the greatest relative difference between the RSRP values of the candidate sectors exceeds the power threshold, there is a clear dominant carrier (i.e., the one that has the greatest RSRP value of the candidate sectors) and so no RSRQ values are needed to determine a candidate sector for handover. In some examples, in addition to the greatest relative difference between the RSRP values of the candidate sectors exceeding the power threshold, wireless communication device 101 also bases the decision to transfer the RSRP values of the candidate sectors responsive to an event trigger, periodic schedule, or other parameters that may be dictated by measurement setup instructions received by wireless communication device 101. It should be noted that implementation decisions and/or threshold value selection may dictate the behavior in the case of the greatest relative difference between the RSRP values of the candidate sectors equaling the power threshold. For example, wireless communication device 101 could transfer just the RSRP values of the candidate sectors if the greatest relative difference between the RSRP values of the candidate sectors equals or exceeds the power threshold in some examples, but could transfer the RSRP values of the candidate sectors and the RSRQ value of a strongest candidate sector if the greatest relative difference between the RSRP values of the candidate sectors equals or falls below the power threshold in other examples. Other design choices to implement the above techniques are also possible and within the scope of this disclosure.

Advantageously, wireless communication device 101 compares the greatest relative difference of measured RSRP values of candidate sectors to a power threshold to dynamically determine whether or not to send an RSRQ value of a strongest candidate sector in addition to the RSRP values of the candidate sectors. Since the power threshold is typically set high enough that it is only exceeded if there is a clearly dominant candidate sector in terms of its RSRP value relative to the other candidates, the handover decision does not necessitate the additional information available in the RSRQ values when the threshold is exceeded. In this manner, the size of the measurement report is reduced and reverse link bandwidth is thereby conserved, without negatively impacting performance of the network or the user experience.

Referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNodeB), and others—including combinations thereof. Wireless network protocols that may be utilized by wireless access node 110 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Communication network 130 comprises the core network of a wireless communication service provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

Wireless communication link 111 uses the air or space as the transport medium. Wireless communication link 111 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication link 121 uses metal, air, space, optical fiber such as glass or plastic, or some other material as the transport medium—including combinations thereof. Communication link 121 could use various communication protocols, such as TDM, IP, Ethernet, telephony, optical networking, hybrid fiber coax (HFC), communication signaling, wireless protocols, or some other communication format—including combinations thereof. Communication link 121 may be a direct link or could include intermediate networks, systems, or devices.

Figure 3:
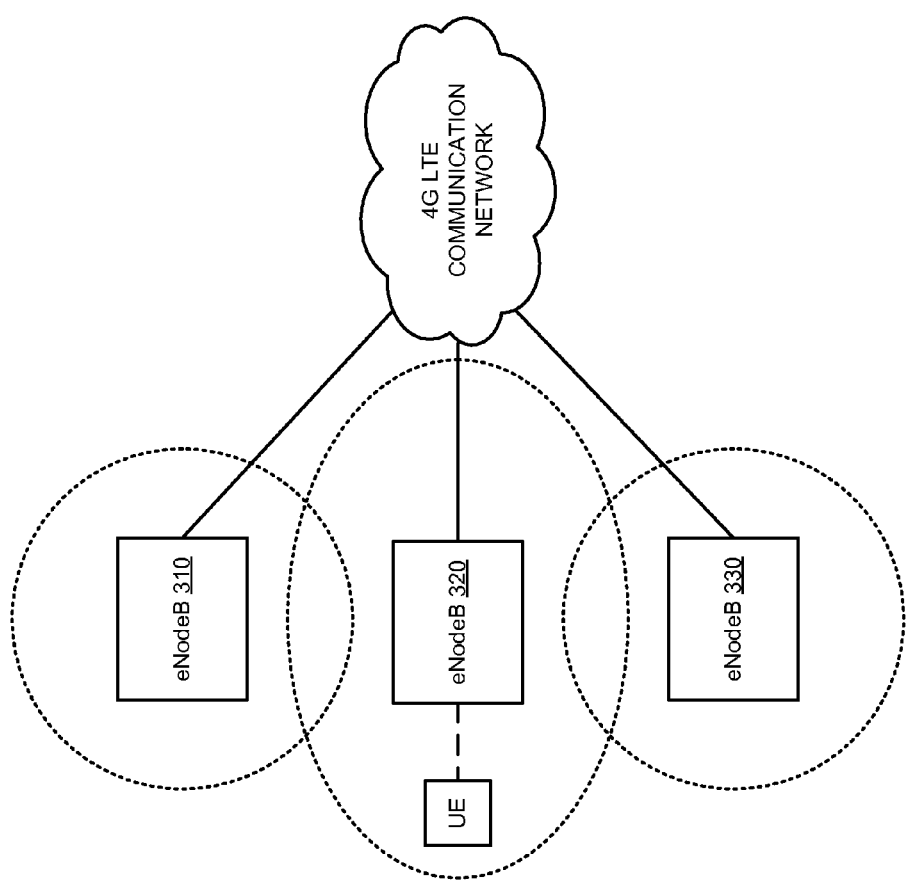
FIG. 3 is a block diagram that illustrates a long term evolution communication system in an exemplary embodiment.

FIG. 3 is a block diagram that illustrates long term evolution (LTE) communication system 300 in an exemplary embodiment. LTE communication system 300 includes enhanced Node B (eNodeB) nodes 310, 320, and 330 that are in communication with the 4G LTE communication network. 4G LTE communication network could include a mobility management entity (MME), serving gateway (SGW), packet data network gateway (PGW), and other network elements typically found in a 4G LTE communication network. Each eNodeB 310, 320, and 330 has a wireless coverage area with approximate boundaries as indicated by the dotted lines encircling each respective eNodeB, which are typically defined by the signal propagation characteristics and coverage capabilities of each eNodeB 310, 320, and 330. In particular, each dotted line encircling each eNodeB 310, 320, and 330 represents a cell coverage area provided by each respective eNodeB 310, 320, and 330. Each eNodeB 310, 320, and 330 provides an example of wireless access node 110, although node 110 may use alternative configurations. LTE communication system 300 also includes a user equipment (UE) device that is in the same cell sector served by eNodeB 320. Thus, the cell surrounding eNodeB 320 could be referred to as a serving cell for the UE, whereas the cells surrounding eNodeBs 310 and 330 could be considered candidate cells.

Figure 4:
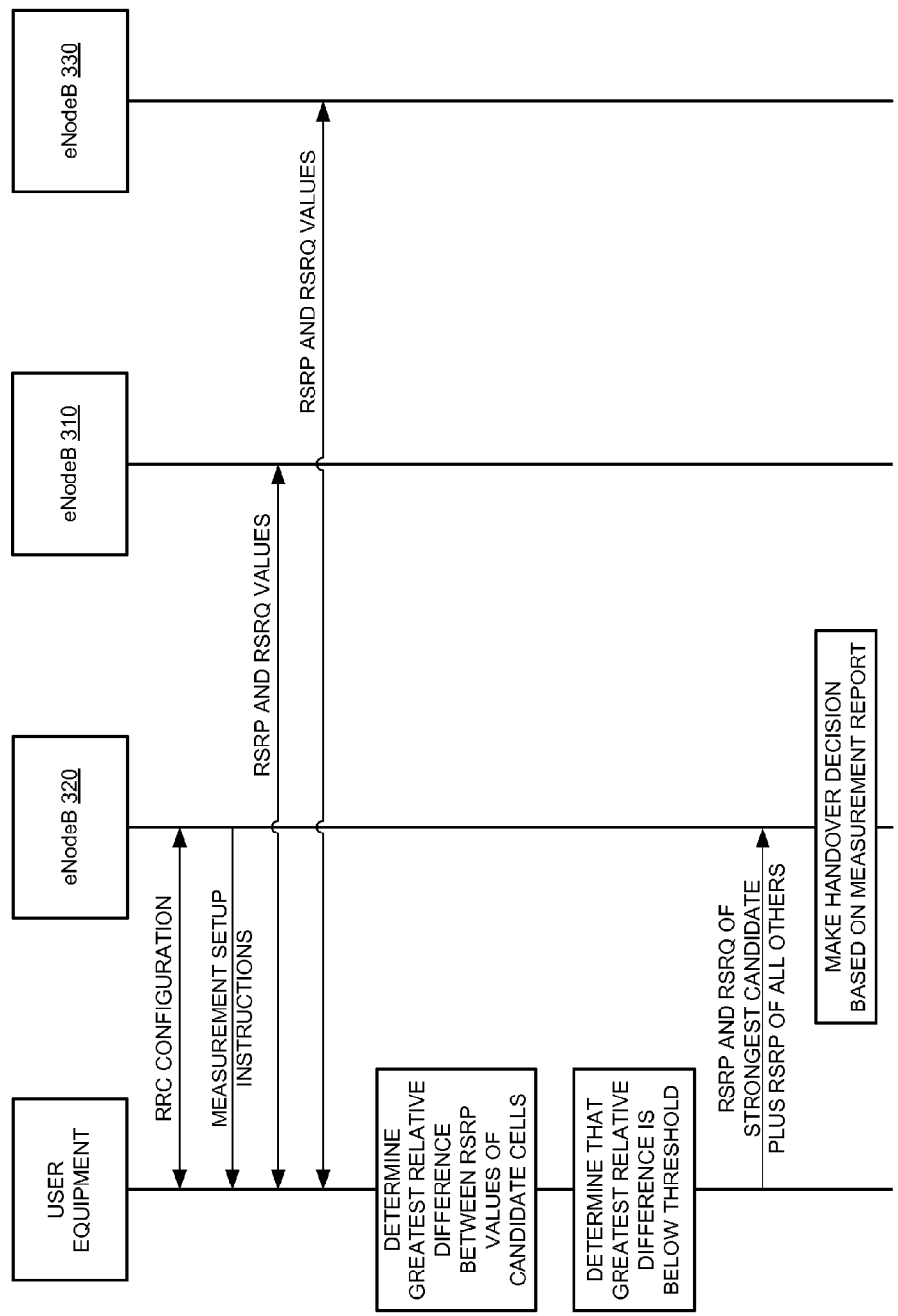
FIG. 4 is a sequence diagram that illustrates an operation of the long term evolution communication system in an exemplary embodiment.

FIG. 4 is a sequence diagram that illustrates an operation of LTE communication system 300 in an exemplary embodiment. The operation of FIG. 4 provides an example of an intra-LTE mobility technique that may be employed by LTE communication system 300.

To begin, eNodeB 320 serving the UE performs a radio resource control (RRC) configuration procedure and the UE enters an RRC connected mode. During the RRC configuration, eNodeB 320 sends measurement setup instructions to the UE. The measurement setup instructions include events or conditions that trigger the UE to start measurement reporting, conditions that trigger the UE to stop measurement reporting, the type of measurements to be performed by the UE, a duration of time the UE should wait between periodic reporting, measurement bandwidth, the maximum number of cells to report to the eNodeB, and filter parameters such as offset, time to trigger, and hysteresis. In this example, the measurement reporting instructions also include a threshold value for the UE to compare to relative differences of RSRP values of candidate cells.

The UE measures reference signal received power (RSRP) and reference signal received quality (RSRQ) from each of the candidate cells served by eNodeB 310 and eNodeB 330, respectively. Typically, once a measurement reporting event has been triggered, the UE would start sending the RSRP and RSRQ of the candidate cells in a measurement report to eNodeB 320 on uplink timeslots (i.e., during PUSCH symbols). However, each measurement report the UE sends to eNodeB 320 consumes reverse link resources, and minimizing the amount of measurement reports as well as the information included in each report would result in higher throughputs and higher capacity. To this end, the UE in this example dynamically determines whether or not to send a measurement report, and what to include in the measurement report. In other words, the UE makes an intelligent decision on when to send just RSRP values to the eNodeB 320 and when to send both RSRP and RSRQ values of candidate cells.

The RSRQ measurements are more relevant and useful in assisting eNodeB 320 in making a handover decision when the UE observes multiple cells of relatively similar RSRP. Therefore, the UE calculates the greatest relative difference between the RSRP values of the candidate cells in order to determine whether or not RSRQ values are needed in the measurement report. For example, if the UE measures RSRP values of five, six, and seven for the candidate cells, then the greatest relative difference between these RSRP values is two (i.e., seven minus five).

Once the greatest relative difference between the RSRP values of the candidate cells is calculated, the UE compares the relative difference to a threshold value. If the greatest relative difference between the RSRP values falls below a certain predetermined threshold, the UE would send both RSRP and RSRQ values for the strongest candidate cell (i.e., the cell having the highest RSRP value) and would send just the RSRP values of the rest of the candidate cells. This is because the RSRQ value is more important when there are multiple candidate cells having relatively similar RSRP values, which is the case when the greatest relative difference between the RSRP values of the candidate cells falls below the threshold. Of course, if there are multiple candidate cells that share the highest RSRP value, the UE could send the RSRQ values of each of these equally-dominant candidate cells in the measurement report. In the alternative, if the greatest relative difference between the RSRP values exceeds the threshold, the UE would send just the RSRP values of all the candidate cells, because the candidate cell having the greatest RSRP value is a clearly dominant candidate that caused the greatest relative difference between the RSRP values to exceed the threshold.

In this example, the UE determines that the greatest relative difference between the candidate cells is below the threshold, indicating that there are multiple candidate cells with similar RSRP values, and that the RSRQ value of the strongest candidate would be useful to eNodeB 320 in making a handover decision. Therefore, the UE sends the RSRP values of all the candidate cells, and the RSRQ value of the strongest candidate to eNodeB 320 in a measurement report. Based on the information in the measurement report, eNodeB 320 then makes the handover decision. In this manner, the UE assists eNodeB 320 in making the handover decision, while conserving network resources by reducing the size of the measurement report by including only the information that eNodeB 320 needs to make the handover decision and not including all RSRP and RSRQ values of all candidate cells.

Figure 5:
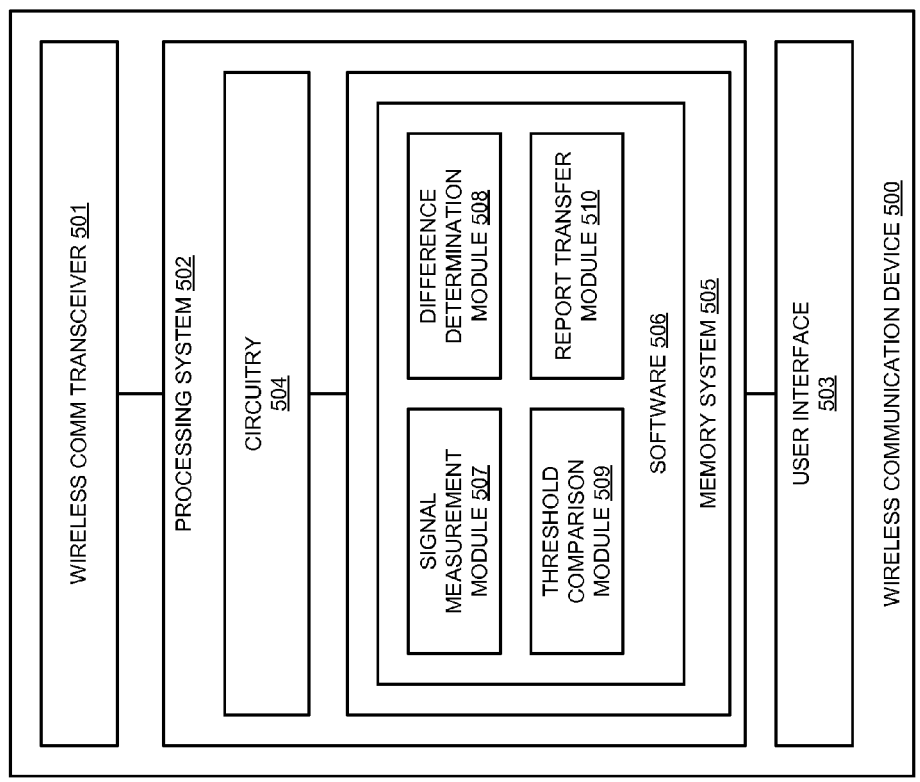
FIG. 5 is a block diagram that illustrates a wireless communication device.

FIG. 5 is a block diagram that illustrates wireless communication device 500. Wireless communication device 500 provides an example of wireless communication device 101, although device 101 could use alternative configurations. Wireless communication device 500 comprises wireless communication transceiver 501, processing system 502, and user interface 503. Processing system 502 is linked to wireless communication transceiver 501 and user interface 503. Processing system 502 includes processing circuitry 504 and memory system 505 that stores operating software 506. Operating software 506 comprises software modules 507-510. Wireless communication device 500 may include other well-known components such as a battery and enclosure that are not shown for clarity. Wireless communication device 500 may comprise a telephone, computer, e-book, mobile Internet appliance, media player, game console, wireless network interface card, or some other wireless communication apparatus—including combinations thereof.

Wireless communication transceiver 501 comprises RF communication circuitry and an antenna. The RF communication circuitry typically includes an amplifier, filter, RF modulator, and signal processing circuitry. Wireless communication transceiver 501 may also include a memory system, software, processing circuitry, or some other communication device. Wireless communication transceiver 501 may use various protocols, such as CDMA, GSM, UMTS, HSPA, EV-DO, EV-DO rev. A, 3GPP LTE, LTE Advanced, WiMAX, Wi-Fi, Bluetooth, Internet, telephony, or some other wireless communication format. Wireless communication transceiver 501 may be configured to measure reference signal received power (RSRP) values and reference signal received quality (RSRQ) values of a plurality of candidate sectors. Further, wireless communication transceiver 501 may be configured to transfer the RSRP values of the candidate sectors and one of the RSRQ values associated with a strongest candidate sector having a greatest RSRP value of the candidate sectors if the greatest relative difference between the RSRP values of the candidate sectors falls below a power threshold. In addition, wireless communication transceiver 501 may be configured to transfer the RSRP values of the candidate sectors if the greatest relative difference between the RSRP values of the candidate sectors exceeds the power threshold.

User interface 503 comprises components that interact with a user to receive user inputs and to present media and/or information. User interface 503 may include a speaker, microphone, buttons, lights, display screen, touchscreen, touch pad, scroll wheel, communication port, or some other user input/output apparatus—including combinations thereof. User interface 503 may be omitted in some examples.

Processing circuitry 504 comprises microprocessor and other circuitry that retrieves and executes operating software 506 from memory system 505. Processing circuitry 504 may comprise a single device or could be distributed across multiple devices—including devices in different geographic areas. Processing circuitry 504 may be embedded in various types of equipment. Processing circuitry 504 is typically mounted on a circuit board that may also hold memory system 505 and portions of wireless communication transceiver 501 and user interface 503. Memory system 505 comprises a non-transitory computer readable storage medium, such as a disk drive, flash drive, data storage circuitry, or some other hardware memory apparatus. Memory system 505 may comprise a single device or could be distributed across multiple devices—including devices in different geographic areas. Memory system 505 may be embedded in various types of equipment. In some examples, a computer apparatus could comprise memory system 505 and operating software 506. Operating software 506 comprises computer programs, firmware, or some other form of machine-readable processing instructions. Operating software 506 may include an operating system, utilities, drivers, network interfaces, applications, or some other type of software. In this example, operating software 506 comprises software modules 507-510, although software 506 could have alternative configurations in other examples.

When executed by processing circuitry 504, operating software 506 directs processing system 502 to operate wireless communication device 500 as described herein for wireless communication device 101. In particular, operating software 506 directs processing system 502 to direct wireless communication transceiver 501 to measure reference signal received power (RSRP) values and reference signal received quality (RSRQ) values of a plurality of candidate sectors. Operating software 506 further directs processing system 502 to determine a greatest relative difference between the RSRP values of the candidate sectors. In addition, operating software 506 directs processing system 502 to, if the greatest relative difference between the RSRP values of the candidate sectors falls below a power threshold, direct wireless communication transceiver 501 to transfer the RSRP values of the candidate sectors and one of the RSRQ values associated with a strongest candidate sector having a greatest RSRP value of the candidate sectors. Otherwise, operating software 506 directs processing system 502 to, if the greatest relative difference between the RSRP values of the candidate sectors exceeds the power threshold, direct wireless communication transceiver 501 to transfer the RSRP values of the candidate sectors.

In this example, operating software 506 comprises a signal measurement software module 507 that measures RSRP values and RSRQ values of a plurality of candidate sectors. Additionally, operating software 506 comprises a difference determination software module 608 that determines a greatest relative difference between the RSRP values of the candidate sectors. Operating software 506 also comprises a threshold comparison software module 509 that compares the greatest relative difference between the RSRP values of the candidate sectors to a power threshold. Finally, operating software 506 comprises a report transfer software module 510 that transfers the RSRP values of the candidate sectors and one of the RSRQ values associated with a strongest candidate sector having a greatest RSRP value of the candidate sectors if the greatest relative difference between the RSRP values of the candidate sectors falls below the power threshold, but if the greatest relative difference between the RSRP values of the candidate sectors exceeds the power threshold, transfers the RSRP values of the candidate sectors.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device to facilitate a handover from a serving sector to a candidate sector in a wireless communication network, the method comprising:
    measuring reference signal received power (RSRP) values and reference signal received quality (RSRQ) values of a plurality of candidate sectors;
    determining a greatest relative difference between the RSRP values of the candidate sectors;
    if the greatest relative difference between the RSRP values of the candidate sectors falls below a power threshold, transferring the RSRP values of the candidate sectors and one of the RSRQ values associated with a strongest candidate sector having a greatest RSRP value of the candidate sectors; and
    if the greatest relative difference between the RSRP values of the candidate sectors exceeds the power threshold, transferring the RSRP values of the candidate sectors.

2. The method of claim 1 wherein the wireless communication device is operating in a radio resource control (RRC) connected mode.

3. The method of claim 1 wherein determining the greatest relative difference between the RSRP values of the candidate sectors comprises calculating differences between each of the RSRP values of all the candidate sectors and identifying a greatest one of the differences as the greatest relative difference.

4. The method of claim 1 further comprising receiving measurement setup instructions transmitted from a wireless access node, wherein the measurement setup instructions include at least one condition that triggers the wireless communication device to start measurement reporting.

5. The method of claim 4 wherein transferring the RSRP values of the candidate sectors and the one of the RSRQ values associated with the strongest candidate sector having the greatest RSRP value of the candidate sectors comprises transferring the RSRP values of the candidate sectors and the one of the RSRQ values associated with the strongest candidate sector for delivery to the wireless access node responsive to the at least one condition being met.

6. The method of claim 5 wherein the wireless access node is configured to utilize the RSRP values of the candidate sectors and the one of the RSRQ values associated with the strongest candidate sector to determine the candidate sector for the handover.

7. The method of claim 1 wherein the wireless communication network comprises a third generation partnership project long term evolution network.

8. A wireless communication device to facilitate a handover from a serving sector to a candidate sector in a wireless communication network, the wireless communication device comprising:
    a wireless communication transceiver configured to measure reference signal received power (RSRP) values and reference signal received quality (RSRQ) values of a plurality of candidate sectors; and
    a processing system configured to determine a greatest relative difference between the RSRP values of the candidate sectors, and if the greatest relative difference between the RSRP values of the candidate sectors falls below a power threshold, direct the wireless communication transceiver to transfer the RSRP values of the candidate sectors and one of the RSRQ values associated with a strongest candidate sector having a greatest RSRP value of the candidate sectors;

the processing system further configured to, if the greatest relative difference between the RSRP values of the candidate sectors exceeds the power threshold, direct the wireless communication transceiver to transfer the RSRP values of the candidate sectors.

9. The wireless communication device of claim 8 wherein the wireless communication device is operating in a radio resource control (RRC) connected mode.

10. The wireless communication device of claim 8 wherein the processing system configured to determine the greatest relative difference between the RSRP values of the candidate sectors comprises the processing system configured to calculate differences between each of the RSRP values of all the candidate sectors and identify a greatest one of the differences as the greatest relative difference.

11. The wireless communication device of claim 8 wherein the wireless communication transceiver is configured to receive measurement setup instructions transmitted from a wireless access node, wherein the measurement setup instructions include at least one condition that triggers the wireless communication device to start measurement reporting.

12. The wireless communication device of claim 11 wherein the processing system configured to direct the wireless communication transceiver to transfer the RSRP values of the candidate sectors and the one of the RSRQ values associated with the strongest candidate sector having the greatest RSRP value of the candidate sectors comprises the processing system configured to direct the wireless communication transceiver to transfer the RSRP values of the candidate sectors and the one of the RSRQ values associated with the strongest candidate sector for delivery to the wireless access node responsive to the at least one condition being met.

13. The wireless communication device of claim 12 wherein the wireless access node is configured to utilize the RSRP values of the candidate sectors and the one of the RSRQ values associated with the strongest candidate sector to determine the candidate sector for the handover.

14. The wireless communication device of claim 8 wherein the wireless communication network comprises a third generation partnership project long term evolution network.

15. A computer apparatus to facilitate a handover from a serving sector to a candidate sector in a wireless communication network, the apparatus comprising:
software instructions configured, when executed by a wireless communication device, to direct the wireless communication device to measure reference signal received power (RSRP) values and reference signal received quality (RSRQ) values of a plurality of candidate sectors, determine a greatest relative difference between the RSRP values of the candidate sectors, if the greatest relative difference between the RSRP values of the candidate sectors falls below a power threshold, transfer the RSRP values of the candidate sectors and one of the RSRQ values associated with a strongest candidate sector having a greatest RSRP value of the candidate sectors, and if the greatest relative difference between the RSRP values of the candidate sectors exceeds the power threshold, transfer the RSRP values of the candidate sectors; and
at least one non-transitory computer-readable storage medium storing the software instructions.

16. The computer apparatus of claim 15 wherein the wireless communication device is operating in a radio resource control (RRC) connected mode.

17. The computer apparatus of claim 15 wherein the software instructions configured to direct the wireless communication device to determine the greatest relative difference between the RSRP values of the candidate sectors comprises the software instructions configured to direct the wireless communication device to calculate differences between each of the RSRP values of all the candidate sectors and identify a greatest one of the differences as the greatest relative difference.

18. The computer apparatus of claim 15 wherein the software instructions further direct the wireless communication device to receive measurement setup instructions transmitted from a wireless access node, wherein the measurement setup instructions include at least one condition that triggers the wireless communication device to start measurement reporting.

19. The computer apparatus of claim 18 wherein the software instructions configured to direct the wireless communication device to transfer the RSRP values of the candidate sectors and the one of the RSRQ values associated with the strongest candidate sector having the greatest RSRP value of the candidate sectors comprises the software instructions configured to direct the wireless communication device to transfer the RSRP values of the candidate sectors and the one of the RSRQ values associated with the strongest candidate sector for delivery to the wireless access node responsive to the at least one condition being met.

20. The computer apparatus of claim 19 wherein the wireless access node is configured to utilize the RSRP values of the candidate sectors and the one of the RSRQ values associated with the strongest candidate sector to determine the candidate sector for the handover.

* * * * *